United States Patent [19]
Ferraris

[11] 3,734,255
[45] May 22, 1973

[54] FRICTION COUPLING, PARTICULARLY FOR THE COLLECTING REEL OF A CINEMATOGRAPHIC PROJECTOR OF THE LIKE

[75] Inventor: Enrico Ferraris, Turin, Italy

[73] Assignee: Officine Precisione Luserna S.p.A., Turin, Italy

[22] Filed: Sept. 10, 1971

[21] Appl. No.: 179,489

[52] U.S. Cl..................192/36, 192/41 R, 192/41 S, 64/30 E
[51] Int. Cl...........................F16d 7/02, F16d 41/20
[58] Field of Search..........................64/30 E; 192/26, 192/35, 36, 41 R, 41 S

[56] References Cited

UNITED STATES PATENTS

| | | | |
|---|---|---|---|
| 1,163,298 | 12/1915 | Winkler | 192/36 X |
| 3,194,369 | 7/1965 | Witte | 192/36 UX |
| 3,261,437 | 7/1966 | Kramm | 192/41 R |
| 3,511,348 | 5/1970 | Jonsson et al. | 192/36 X |

Primary Examiner—Allan D. Herrmann
Attorney—Young & Thompson

[57] ABSTRACT

An automatic friction coupling to be mounted between a driving member and a driven member, particularly the collecting reel of a cinematographic projector, wherein a slightly braked ring connected to the driving member is oscillable between two limit positions and carries an entrainment member suitable to engage in one of said limit positions, and to disengage in the other of said limit positions of the ring, with a tang of a resilient wire wound onto a shaft connected to the driven member, thus entraining the driven member with a limited torque, in one direction of rotation, while leaving free said driven member in the opposite direction of rotation.

6 Claims, 3 Drawing Figures

Patented May 22, 1973  3,734,255

# FRICTION COUPLING, PARTICULARLY FOR THE COLLECTING REEL OF A CINEMATOGRAPHIC PROJECTOR OF THE LIKE

BACKGROUND OF THE INVENTION

The present invention relates to an automatic friction coupling or clutch, adapted for interposing between a driving member and a driven member for the purpose of establishing entrainment with a torque limited to a predetermined value when the driving member rotates in one direction, and to leave the driven member essentially idle when the driving member rotates in the opposite direction. This clutch is particularly suitable for entraining the collecting spool for the film in a cinematographic projector, magnetic recorder or like apparatus, and other applications having similar requirements.

During normal movement of the film being projected, the collecting spool of a cinematographic projector must be entrained to move with the possibility of slip in order to collect the quantity of film which passes through the movement mechanisms notwithstanding the progressive variation in winding diameter on the collecting spool, and with a limited torque adapted to ensure correct tension of the wound film and the sure overcoming of all normal and accidental resistances. This torque must be relatively large in order to give rise to a sufficient film tension even when the collecting spool is nearly full and winding takes place on a large diameter. On the other hand, when the film is made to recede, and especially during rearward projection, the resistance which opposes the unwinding of the film from the spool which during normal working acts as the collecting spool must be as small as possible in order not to overload the means driving the film and possibly hinder regular operation.

These are two contrasting requirements and it has not been possible up to the present time to satisfy them with means simple enough to permit industrial application, and also because for practical reasons it is necessary to avoid the necessity for any manual control of the user, so that the passage from the one state to the other is automatic.

BRIEF SUMMARY OF THE INVENTION

The object of the present invention is to provide a completely satisfactory solution to this problem, and this object is attained according to the invention by the fact that the shaft which supports the collecting spool is mounted idle on the projector structure; the driving member which entrains said shaft in normal projection is idly mounted coaxially with the shaft; on this driving member a ring is pivoted disposed to oscillate between two eccentric positions in opposite directions, said ring being lightly braked in order to assume the one or the other of said eccentric positions according to the direction of rotation of the driving member; and about a bush rigid with the shaft is wound a resilient wire constituting a clutch provided with a tang which engages with said ring when in one of its two eccentric positions, then entraining the shaft with the possibility of slip and with the transmission of a limited torque, whereas when the ring is in the other eccentric position the tang of the resilient wire is disengaged and leaves the shaft supporting the spool free to rotate.

BRIEF DESCRIPTION OF THE DRAWINGS

The invention will be more evident from the description which follows of one non-limitative embodiment, given by way of example and diagrammatically represented in the accompanying drawings, wherein.

DETAILED DESCRIPTION OF THE PREFERRED EMBODIMENT

Figure 1:
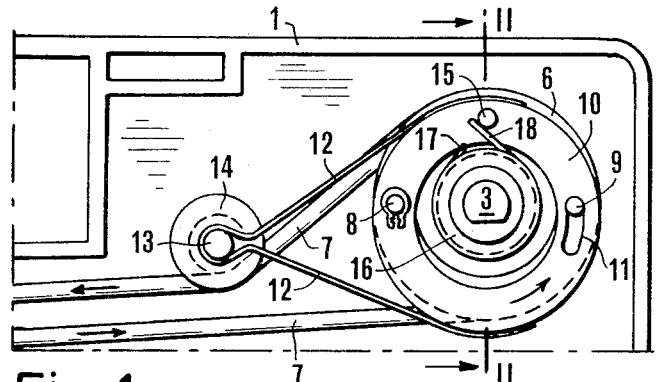
FIG. 1 is a view of the device under normal running conditions, seen axially with respect to the shaft supporting the spool and from the side opposite the spool.
Figure 2:
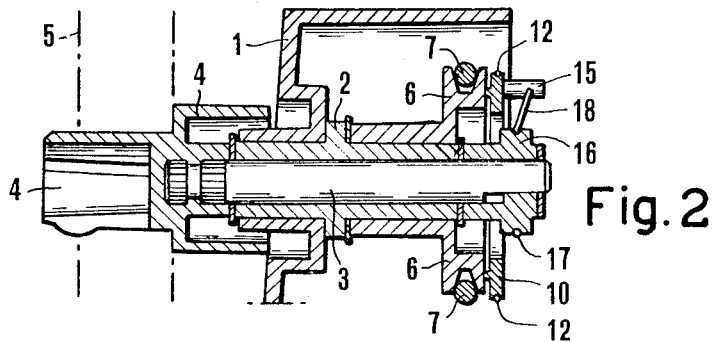
FIG. 2 is an axial section taken along the line II—II of FIG. 1.

The reference numeral 1 indicates the projector structure which conventionally also constitutes a portion of the casing, and is provided on the axis of the collecting spool with a fixed bush 2 in which freely rotates the shaft provided at one end with a spool supporting head 4 of a conventional type, on which the spool 5 is mounted. The driving member 6, in the form of a pulley driven by a belt 7 leading to the projector motor or to another part adapted to transmit motion, is mounted idly on the bush 2, on the part opposite the spool 5. The driving member 6 comprises two diametrically opposed pivots, 8 and 9, on the first of which is pivoted a ring 10 provided with an elongated window or slot 11 adapted to slide on the second pivot 9, thus allowing a limited oscillation of the ring 10 between two eccentric positions shown respectively in FIGS. 1 and 3. The ring 10 is in the form of a pulley and in its throat it engages a clip of a resilient metal wire 12, mounted on a fixed pivot 13, in this case a pivot which supports an intermediate pulley 14 for the belt 7. The ring 10 comprises an entrainment member formed by a pivot 15 projecting from the side opposite the driving member 6. Said entrainment member is preferably disposed on said ring on a diameter of said ring substantially perpendicular to one of the diameters passing through said pivot 8 and said aperture 11, for having a maximum radial displacement of the entrainment member 15 as a consequence of the displacement of said ring 10.

On that end of the shaft 3 opposite the spool 5 a bush 16 is keyed and it is provided with a throat in which a resilient metal wire 17 is wound constituting a winding clutch device of conventional type. One of the two ends of the wire 17 projects considerably with respect to the periphery of the bush 16, forming a tang 18. The extent of projection of this tang with respect to the periphery of the bush 16, i.e. the radial length of the projecting extremity of the resilient wire, is comprised between the maximum and minimum distance from said bush of the entrainment member 15, respectively in the two limit positions of the ring 10.

The operation of the device is as follows.

Under normal running conditions (projection in forward movement) the belt 7 causes the pulley 6 to rotate in the counter-clockwise direction with reference to FIG. 1. The ring 10 is entrained in the same direction, but is retarded with respect to the pulley 6 because of the light braking action exerted by the flexible clip 12. The ring 10 is hence brought into its eccentric position by which the distance between the pivot 15 and the periphery of the bush 16 is a minimum. Under these conditions the entrainment member 15 approaches said bush, encounters the projecting extremity or tang 18 of the wound resilient wire 17, engages said projecting extremity, and entrains by means of it the bush 16, shaft 3, spool holder 4 and collecting spool 5, The wound resilient wire 17 can only transmit a predetermined torque, which if exceeded leads to slipping on the bush 16. Consequently the spool is entrained with the possibility of slipping and with a maximum predetermined torque, which may be chosen at the most convenient value for forward operation, without considering the fact that this value will be excessive for rearward operation.

Figure 3:
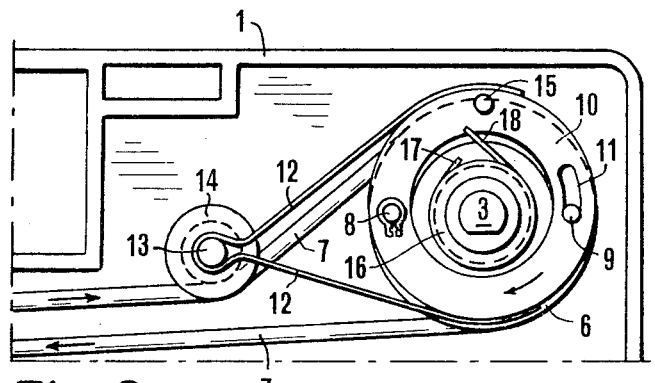
FIG. 3 is a view similar to FIG. 1, but under backward running conditions.

Under rearward running conditions (rearward projection) the belt 7 causes the pulley 6 to rotate in the clockwise direction with reference to FIG. 3. The ring 10 is entrained in the same direction but is retarded with respect to the pulley 6 because of the light braking action exerted by the resilient clip 12. The ring 10 is hence brought into its eccentric position by which the distance between the pivot 15 and periphery of the bush 16 is a maximum. Under these conditions the pivot 15 does not encounter the tang 18 of the wound resilient wire 17, and hence the bush 16, shaft 3, spool holder 4 and collecting spool 5 are left free to rotate without any resistance other than the unavoidable friction arising from the shaft 3 in the fixed support bush 2. There is thus no resistance set up prejudicial to rearward working.

It is clear that passage from the condition of entrainment of the spool in forward running to the condition of freedom in rearward running is obtained readily, i.e., after rotation of the driving member 6 through an angle corresponding at most only to the angular extension of the slot 11. Passage from the condition of freedom to that of entrainment may however require even an entire revolution, which however does not give rise to any disadvantage.

The constructional embodiment illustrated is given by way of example only, and the various parts can be variously conformed or substituted by technical equivalents, while maintaining the same functions. Likewise its application to the entrainment of the collecting spool of a cinematographic projector represents a typical but not exclusive application of the object of the invention, which may be used wherever similar requirements occur, and particularly in magnetic recorders and other apparatus operating on material in the form of tape or wire.

Having thus described my invention, what I claim is:

1. An automatic clutch for interposing between a driving member and a driven member both mounted on a structure, for entraining said driven member with the possibility of slip and with a limited torque when the driving member rotates in a first direction, and for leaving substantially free the driven member when the driving member rotates in a second direction opposite to said first direction, said clutch comprising a shaft free rotatably mounted on said structure, said driven member being connected to said shaft, said driving member being free rotatably mounted on said structure coaxial with said shaft, a bush keyed onto said shaft and a resilient wire wound on said bush, said resilient wire forming a winding clutch device, one extremity of said resilient wire projecting towards the outside, a first pivot mounted at the periphery of said driving member, a ring mounted on said first pivot, an entrainment member peripherically mounted on said ring, said ring being movable with respect to said driving member between a first limit position wherein the distance of said entraining member from said bush is minimum and a second limit position wherein said distance is maximum, said projecting extremity of the resilient wire having a radial length comprised between said minimum and maximum distances of said entrainment member from said bush, and braking means mounted on said structure cooperating with said ring for lightly braking said ring when it rotates, whereby in the first direction of rotation of said driving member said entraining member approaches said bush, engages said projecting extremity of said resilient wire and entrains said bush, said shaft and the driven member with the possibility of slip and with limited torque, whereas in the second direction of rotation of said driving member said entraining member withdraws from said bush, disengages from said projecting extremity of said resilient wire and leaves said bush, said shaft and the driven member free.

2. A clutch as set forth in claim 1, further comprising a second pivot mounted on said driving member substantially diametrically opposite said first pivot, and wherein said ring has an elongated aperture traversed by said second pivot for determining the two limit positions of said ring; said entraining member being disposed on said ring on a diameter of said ring substantially perpendicular to one of the diameters passing through said first pivot and through said elongated aperture.

3. A clutch as set forth in claim 1, in which said structure has a support member, a resilient clip is mounted on said support member and embraces with slight friction a part of the profile of said ring, said resilient clip constituting said braking means.

4. A clutch as set forth in claim 1, in which said driving member is a pulley, and further comprises a driving belt passing over said pulley.

5. A clutch as set forth in claim 1, in which said shaft has a connection means which constitutes a spool holder, said connection means being designed to receive a collecting spool which constitutes said driven member.

6. A cinematographic projector comprising a clutch as set forth in claim 1, in which said driven member is the collecting spool for the film.

* * * * *